(12) United States Patent
Sekimoto et al.

(10) Patent No.: US 9,166,493 B2
(45) Date of Patent: Oct. 20, 2015

(54) POWER CONVERTER CIRCUIT

(75) Inventors: Morimitsu Sekimoto, Osaka (JP);
Toshiyuki Maeda, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 173 days.

(21) Appl. No.: 13/383,806

(22) PCT Filed: May 27, 2010

(86) PCT No.: PCT/JP2010/058995
§ 371 (c)(1),
(2), (4) Date: Jan. 12, 2012

(87) PCT Pub. No.: WO2011/007620
PCT Pub. Date: Jan. 20, 2011

(65) Prior Publication Data
US 2012/0113693 A1    May 10, 2012

(30) Foreign Application Priority Data
Jul. 15, 2009  (JP) .................. 2009-166378

(51) Int. Cl.
| | |
|---|---|
| H02M 5/458 | (2006.01) |
| H02M 1/32 | (2007.01) |
| H02M 1/00 | (2007.01) |
| H02M 1/36 | (2007.01) |

(52) U.S. Cl.
CPC .............. *H02M 5/458* (2013.01); *H02M 1/32* (2013.01); *H02M 1/36* (2013.01); *H02M 2001/0006* (2013.01)

(58) Field of Classification Search
USPC .................. 363/69–70, 37, 34–35
See application file for complete search history.

(56) References Cited

U.S. PATENT DOCUMENTS 5,216,586 A * 6/1993 Saito ........................ 363/49
6,307,762 B1 * 10/2001 Shiobara .................... 363/69
(Continued)

FOREIGN PATENT DOCUMENTS

| JP | 59010170 A | * | 1/1984 |
|---|---|---|---|
| JP | 63-58899 U | | 4/1988 |

(Continued)

OTHER PUBLICATIONS

"Improved Power Factor Rectifier Circuit for Inverter Controlled PM Motor" written by Isao Takahashi announced at 2000 Technical Meeting 4-149 of the Institute of Electrical Engineers of Japan (held in Mar. 2000), p. 1591.

*Primary Examiner* — Harry Behm
(74) *Attorney, Agent, or Firm* — Global IP Counselors

(57) ABSTRACT

A power converter circuit includes a diode group, a relay, a DC section and an inverter. The diode group includes a plurality of diodes arranged to rectify an output voltage of an alternating-current power supply. The relay is provided at a point located closer to the alternating-current power supply than the diode group. The DC section is where an output voltage of the diode group is applied. The inverter is arranged to output a three-phase alternating-electric current to a three-phase load. The DC section has a maximum pulse voltage twice as great as a minimum pulse voltage of the DC section. The DC section includes an energy-absorbing circuit having an electrolytic capacitor. The DC section further has a pathway arranged to apply the output voltage of the alternating-current power supply from the alternating-current power supply to the electrolytic capacitor via a rectifying circuit, not via the relay.

13 Claims, 4 Drawing Sheets

(56) References Cited

U.S. PATENT DOCUMENTS 7,830,036 B2 * 11/2010 Wei et al. .................. 307/31
8,400,797 B2 * 3/2013 Chan et al. ................. 363/86

FOREIGN PATENT DOCUMENTS

| JP | 2001-333573 A | 11/2001 |
| JP | 2005-20836 A | 1/2005 |

* cited by examiner

PRIOR ART

PRIOR ART

POWER CONVERTER CIRCUIT

CROSS-REFERENCE TO RELATED APPLICATIONS

This U.S. National stage application claims priority under 35 U,S.C. §119(a) to Japanese Patent Application No. 2009-166378, filed in Japan on Jul. 15, 2009, the entire contents of which are hereby incorporated herein by reference.

BACKGROUND OF THE INVENTION

1. Field of the Invention

The present invention relates to a power converter circuit provided between an alternating-current power supply and a load.

2. Description of Related Art

A variety of power converter circuits for respectively supplying a load with a predetermined alternating-electric current provided between an alternating-current power supply and the load have been developed. Out of them, downsizing of inverters and inverters without capacitors aimed for a cost-cut have been suggested "IMPROVED POWER FACTOR RECTIFIER CIRCUIT FOR INVERTER CONTROLLED PM MOTOR" written by Isao Takahashi announced at 2000 Technical Meeting 4-149 of the Institute of Electrical Engineers of Japan (held in March, 2000) page 1591). As shown in FIG. 6, an inverter 40 without capacitor comprises: a diode group 16; a DC section 18; and an inverter 20. Further, a relay S for power shutdown is provided at a point between the power supply 12 and the diode group 16 to prevent electric energy from inflowing into the DC section 18 when the inverter 20 stops.

The diode group 16 is a diode bridge consisting of four diodes. The diode group 16 performs full-wave rectification for an output of the alternating-current power supply 12 and outputs to a power supply line 22 of an upper arm and a power supply line 24 of a lower arm. The DC section 18 comprises: a reactor fin inserted into the power supply lines 22 and 24; and a smoothing capacitor Cdc provided, at a point, between the power supply lines 22 and 24. The DC section 18 does not include a large capacity of an electrolytic capacitor. The capacity of the smoothing capacitor Cdc of the DC section 18 typically has a capacity of about 20 µF, which is about 0.01 to 0.02 time as large as the electrolytic capacitor. The inverter 20 includes a switching power element (transistor) and a reflux diode, and outputs alternating-current power to the load 14.

Direct current voltage fluctuates widely even though the inflow energy into the DC section 18 is small because the smoothing capacitor Cdc of the DC section 18 is small in capacity. Further, examples of the state in which direct current voltage tends to rise include the time when LC resonance of a reactor Lin caused by power supply activation/power strain and a smoothing capacitor Cdc is generated, and the time when inductance energy reflux of the load 14 is performed when the inverter stops.

As shown in FIG. 7, an inverter 40b without capacitor equipped with an energy-absorbing circuit 28 in the DC section 18 has been suggested as a measure to prevent the aforementioned overvoltage (JP 2005-20836 A). In the energy-absorbing circuit 28, a diode Ds, a resistor Rs, an electrolytic capacitor Cs are series-connected to one another between the power supply lines 22 and 24. Since the electrolytic capacitor Cs is also charged as well as the smoothing capacitor Cdc, the apparent capacity of the smoothing capacitor Cdc grows. Moreover, the resistor Rs controls the passing of a charging current through the electrolytic capacitor CS. Accordingly, a potential difference Vdc of both edges of the smoothing capacitor Cdc becomes smaller, which leads to prevent overvoltage.

The charging voltage of the electrolytic capacitor Cs is almost uniformly smoothed. The electrolytic capacitor Cs can be used as a power supply of a circuit for driving at a fixed voltage. Further, the inverter 40b without capacitor is equipped with a control circuit 26 for controlling the switching power element and the relay S. Consequently, it has been suggested in JP 2005-20836 A that the electrolytic capacitor Cs is used as a power supply of the control circuit 26.

However, in the case where the relay S is Off, no voltage is applied to the energy-absorbing circuit 28 equipped with the DC section 18. The electrolytic capacitor Cs to be used as a power supply of the control circuit 26 is not charged, so that the control circuit 26 is not driven. As a result, the relay S cannot be switched on and the inverter 40b without capacitor remains stacked.

SUMMARY

It is an object of the present invention to provide a power converter circuit capable of suppressing overvoltage of a DC section and generating a power supply for a control circuit.

The summary of the present invention is described as follows:

In a first preferred aspect of the present invention, there is provided a power converter circuit which comprises: a diode group including a plurality of diodes for rectifying an output voltage of an alternating-current power supply; a relay provided at a point located closer to the alternating-current power supply than the diode group; a DC section where an output voltage of the diode group is applied; and an inverter for outputting a three-phase alternating-electric current to a three-phase load. The DC section has a maximum pulse voltage twice as great as a minimum pulse voltage thereof. The DC section includes an energy-absorbing circuit having an electrolytic capacitor and has a pathway for applying the output voltage of the alternating-current power supply from the alternating-current power supply to the electrolytic capacitor via a rectifying circuit, not via the relay.

According to the present invention, the power converter circuit generally rectifies at a diode bridge and charges the electrolytic capacitor provided on a subsequent stage. When the relay provided on a former stage of the diode bridge is Off, the power converter circuit charges the electrolytic capacitor from the power supply side via the rectifying circuit, not via the relay.

In a second preferred aspect, the power converter circuit according to the present invention further includes a control circuit for controlling the inverter using a charging voltage of the electrolytic capacitor as a power supply. The control circuit operates using the charging voltage of the electrolytic capacitor as a power supply.

In a third preferred aspect, the power converter circuit according to the present invention further includes a control circuit for switching the relay on/off using the charging voltage of the electrolytic capacitor as a power supply. The electrolytic capacitor is usually used as a power supply of the control circuit because the electrolytic capacitor is charged even when the relay is off.

In a fourth preferred aspect of the power converter circuit according to the present invention, the energy-absorbing circuit is a series circuit between a diode and the electrolytic capacitor. Alternatively, the energy-absorbing circuit is a series circuit among a diode, a resistor, and an electrolytic capacitor. The apparent capacity of the smoothing capacitor in the DC section is increased by the electrolytic capacitor.

In a fifth preferred aspect of the power converter circuit according to the present invention, the pathway for applying the output voltage of the alternating-current power supply to the electrolytic capacitor via the rectifying circuit includes a resistor. The resistor reduces electric current and adjusts the voltage to be applied to the electrolytic capacitor.

In a sixth preferred aspect of the power converter circuit, the rectifying circuit is either a full-wave rectifying circuit or a half-wave rectifying circuit. Full-wave rectification or half-wave rectification is performed to apply a voltage to the electrolytic capacitor.

In a seventh preferred aspect of the power converter circuit of the present invention, the electrolytic capacitor is an electrolytic capacitor of the energy-absorbing circuit provided on the subsequent stage of the diode bridge. The charged voltage is virtually constantly smoothed and becomes a power supply of the control circuit that needs a fixed voltage.

Advantages of the Invention

According to the present invention, it is possible to apply a voltage from the power supply side to the electrolytic capacitor via the rectifying circuit, not via the relay. This makes it possible to charge the electrolytic capacitor even when the relay is Off. Even if the relay is Off, the control circuit using the electrolytic capacitor as a power supply is driven, so that the relay is turned on/off. It is possible for the power converter circuit to prevent, overvoltage because of having an electrolytic capacitor.

DESCRIPTION OF THE PREFERRED EMBODIMENTS

The power converter circuit of the present invention will now be described by referring to the accompanying drawings. The power converter circuit described below is an inverter without capacitor.

Figure 1:
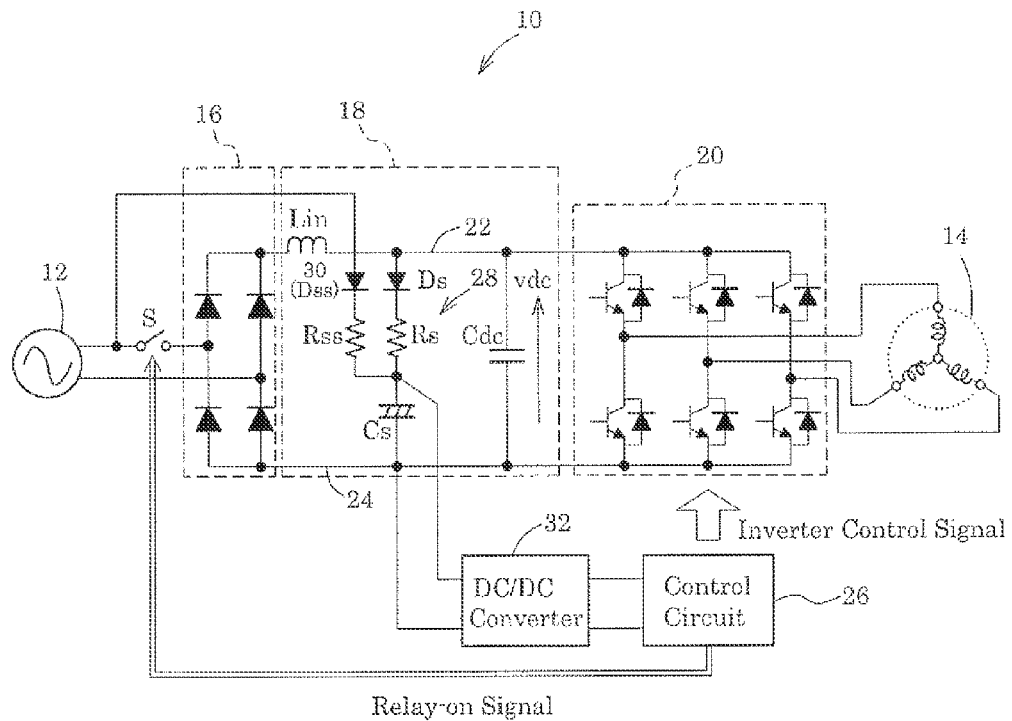
FIG. 1 is a schematic diagram of a power converter circuit according to the present invention.

As shown in FIG. 1, a power converter circuit 10 is used at a point between a power supply 12 and a load 14 and outputs predetermined alternating-current power to the load 14. The power supply 12 shown in FIG. 1 is a single-phase power supply. The load 14 is a three-phase load and an example thereof is three-phase motor.

The power converter circuit 10 includes a relay S, a diode group 16, a DC section 18, and an inverter 20. The diode group 16, the DC section 18, and the inverter 20 are connected to one another by a first power supply line 22 of an upper arm and a second power supply line 24 of a lower arm. Further, the power converter circuit 10 includes a control circuit 26 for driving and controlling the relay S and the inverter 20.

The diode group 16 is a diode bridge consisting of four diodes. The diode group 16 performs full-wave rectification to output a direct current voltage to the first power supply line 2 and the second power supply line 24. The second power supply line 24 is lower than the first power supply line 22 in voltage.

The DC section 18, in which the output of direct current tare is applied to the subsequent stage of the diode group 16, includes a reactor in and a smoothing capacitor Cdc for smoothing the direct current voltage outputted from the diode group 16. The reactor tin is inserted in the first power supply line 22 and is connected to a point between the power supply lines 22 and 24. As shown in FIG. 1, the reactor Lin and the smoothing capacitor Cdc are designed to general smoothing circuits. As described in the prior art, the smoothing capacitor has a low volume.

The DC section 18 has a maximum pulse voltage twice as great as a minimum pulse voltage thereof. And the DC section 18 includes an energy-absorbing circuit 28 as a measure thereof. The energy-absorbing circuit 28 is parallel-connected to the smoothing capacitor Cdc. The energy-absorbing circuit 28 is series-connected to the diode Ds, the resistor Rs, and the electrolytic capacitor Cs in this order from the first power supply line 22 side. In the diode Ds, an anode is connected to the first power supply line 22. The smoothing capacitor Cdc is series-connected to the electrolytic capacitor Cs, resulting in an increase in the apparent capacity of the smoothing capacitor Cdc. The resistor Rs has functions to control a rapid rise in voltage. Overvoltage of the voltage placed between both ends Vdc in the smoothing capacitor Cdc is suppressed by the energy-absorbing circuit 28. Further a voltage smoothed into the fixed voltage is charged on the electrolytic capacitor Cs.

In the present invention, although the resistor Rs is used for the energy-absorbing circuit 28, the resistor Rs may be omitted, if there is no need to minimize the rapid charge on the electrolytic capacitor Cs.

A rectifying circuit 30 is connected to a point located closer to the alternating-current power supply than the relay S to apply a voltage to the electrolytic capacitor Cs via the rectifying circuit 30 in the present invention. That is, even when the relay S is Off, a voltage can be applied to the electrolytic capacitor Cs. The rectifying circuit 30 is a half-wave rectifying circuit, consisting of one diode Dss. The anode of the diode Dss is connected to the alternating-current power supply. A direct current voltage is generated by half-wave rectification. This makes it possible to apply the direct current voltage to the electrolytic capacitor Cs.

The control, circuit 26 transmits a signal to turn the relay S on or transmits a control signal to drive a switching power element to the inverter 20. The control circuit 26 drives a charging voltage of the electrolytic capacitor Cs as a power supply. As mentioned above, it is possible to secure the power supply of the control, circuit 26 because the electrolytic capacitor Cs is charged even though the relay S is Off. It is possible to transmit a signal to turn the relay S on and drive the power converter circuit 10 because the control circuit 26 is always driven. When the relay S is On, charging is performed in the electrolytic capacitor CS via the diode Ds and the resistor Rs. The voltage is converted into a voltage which is capable of driving the control circuit 26 by a DC/DC converter 32 when necessary.

A resistor Rss is provided, between the rectifying circuit 30 and the electrolytic capacitor Cs. This resistor Rss reduces electric current. When the resistor Rs of the energy-absorbing circuit 28 is too great, a drop in voltage in the resistor Rs at the time when energy is absorbed, in other words, when an electric current flows to the resistor Rs, resulting in a rise in voltage Vdc. Thus, there are more cases where the resistor Rss is set to be greater than the resistor Rs. In addition, the resistor Rss may be provided at a point located closer to the power supply 12 than the rectifying circuit 30 in the case where the resistor RSS is located in a pathway between the power supply 12 and the electrolytic capacitor Cs.

Figure 2:
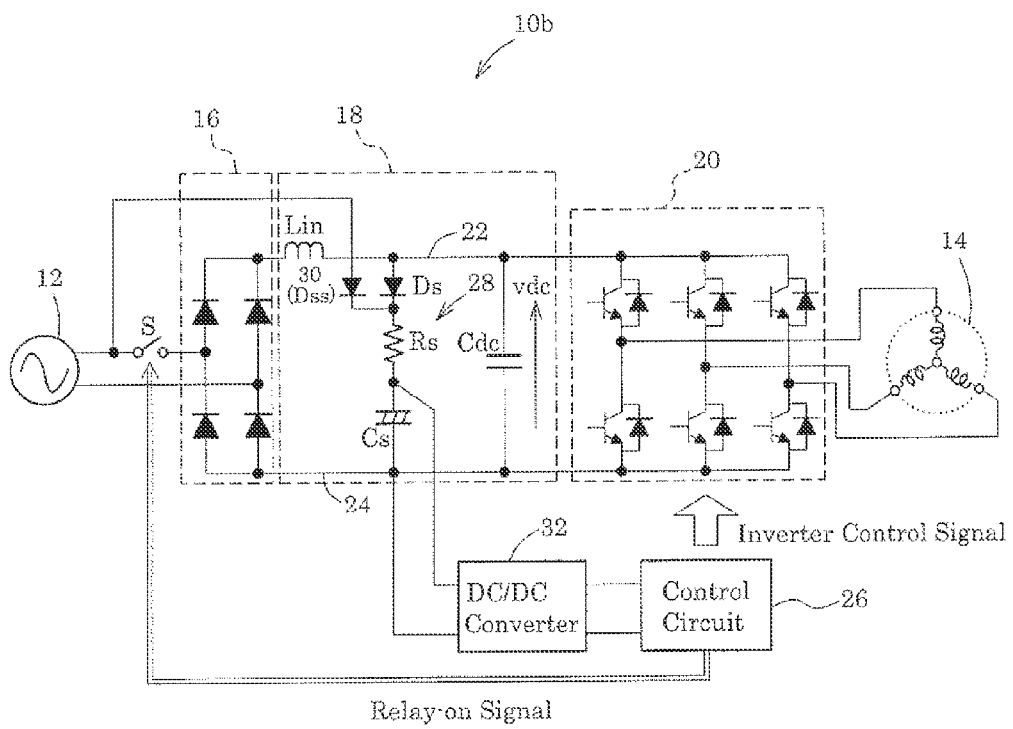
FIG. 2 is a schematic diagram in which a resistor of the power converter circuit shown in FIG. 1 is shared.
Figure 3:
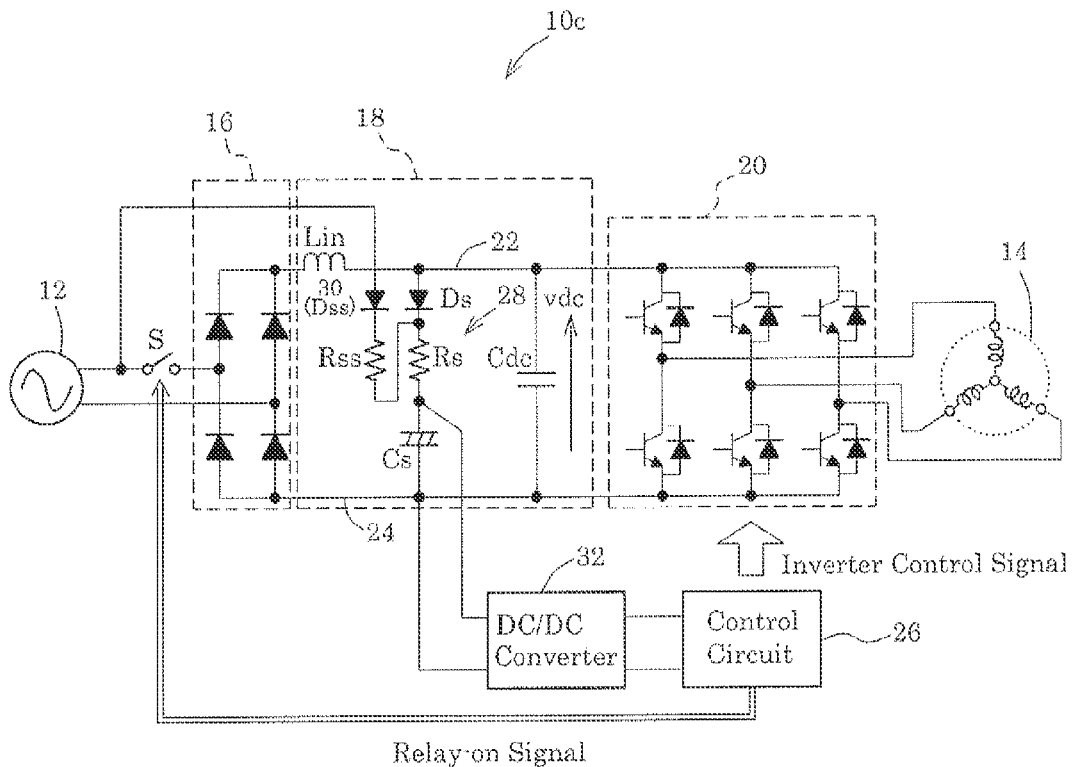
FIG. 3 is a schematic diagram in which a resistor value of the power converter circuit shown in FIG. 1 is adjusted.

When the value of the resistor Rss is the same as that of the resistor Rs, while the resistor Rss still remains like a power converter circuit 10b shown in FIG. 2, an output of the rectifying circuit 30 may be connected to a point between the diode. Ds of the energy-absorbing circuit 28 and the resistor Rs. Further, like a power converter circuit 10c shown in FIG. 3, the output of the rectifying circuit 30 may be connected to a point between the diode Ds of the energy-absorbing circuit 28 and the resistor Rs. As a result, the resistor Rss is series-connected to the resistor Rs, so that two resistors Rss and Rs reduce the electric current. As mentioned above, the value of the resistor Rss is appropriately set.

Figure 4:
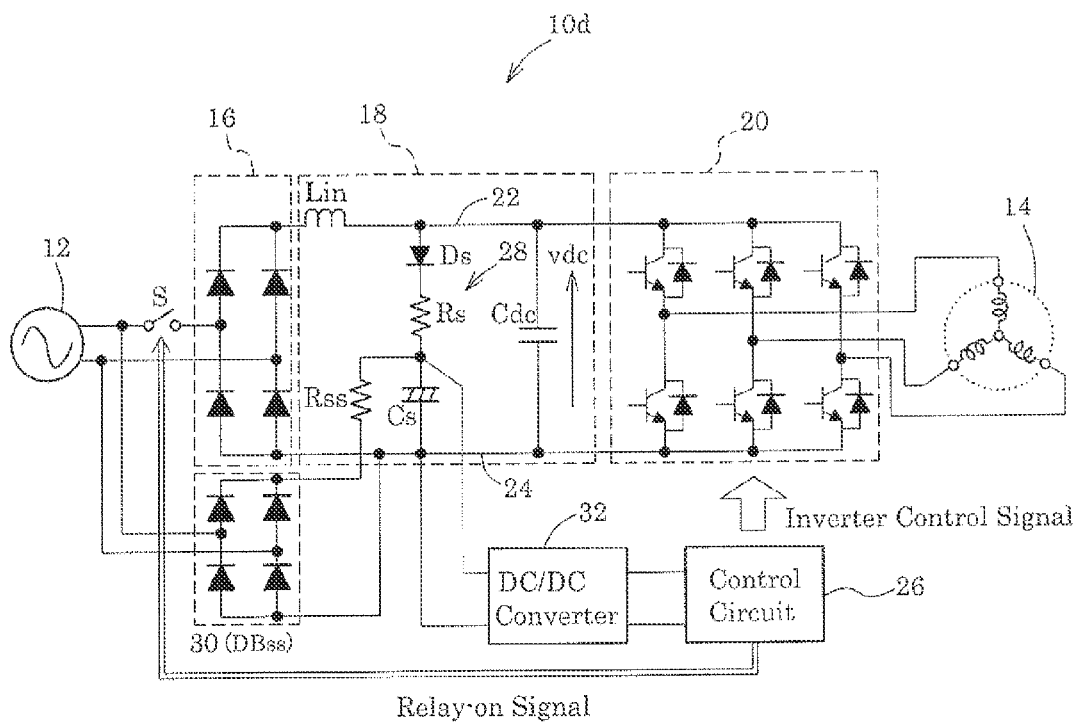
FIG. 4 is a schematic diagram of a power converter circuit according to the present invention using a full-wave rectifying circuit.
Figure 5:
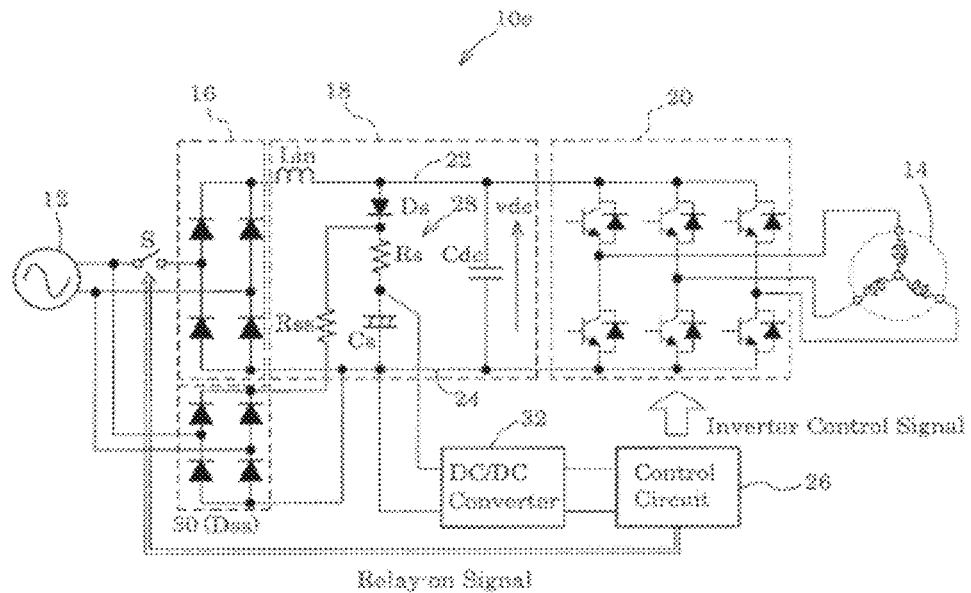
FIG. 5 is a schematic diagram in which a resistor value of the power converter circuit shown in FIG. 4 is adjusted.
Figure 6:
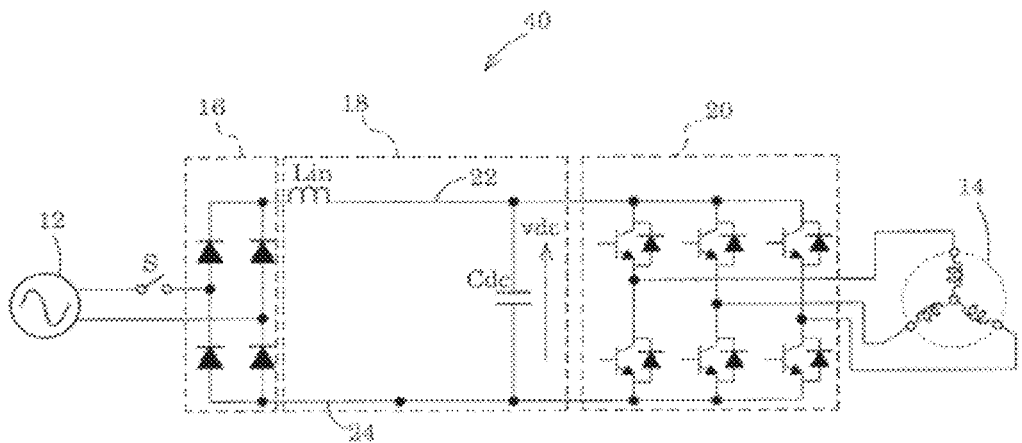
FIG. 6 is a schematic diagram of a conventional inverter without capacitor.
Figure 7:
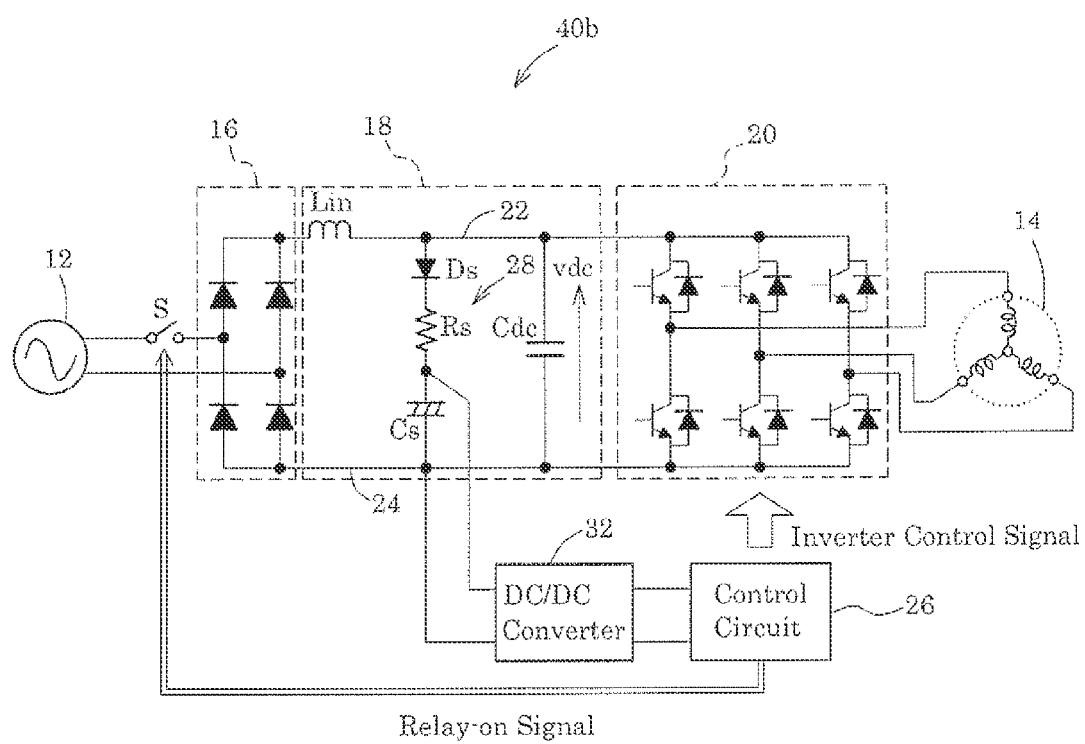
FIG. 7 is a schematic diagram of an energy-absorbing circuit in the inverter without capacitor shown in FIG. 6.

It is to be understood that the rectifying circuit 30 is not limited to a half-wave rectifying circuit. As can be seen from a power converter circuit 10d shown in FIG. 4, a full-wave rectifying circuit consisting of four diodes DBss is connected to a point located closer to the alternating-current power supply than the relay S. An output of the full-wave rectifying circuit is applied to the electrolytic capacitor Cs. Use efficiency of a power supply voltage is more increased than the half-wave rectifying circuit. And as can be seen from a power converter circuit 10e shown in FIG. 5, the output of the full-wave rectifying circuit may be connected to a point between the diode Ds of the energy-absorbing circuit 28 and the resistor Rs. In FIG. 5, there is a case in which it is impossible to set the resistor Rss like FIG. 2. The value of the resistor Rss is appropriately set.

In the inverter 20 two switching power elements (transistors) are series-connected to each other and a connecting section thereof is connected to a terminal of the load 14. The series-connected switching power elements are connected to the first power supply line 22 and the second power supply line 24. Since the load 14 is a three-phase load, the total number of the switching power elements is six. A reflux diode is parallel connected to each switching power element. A desired three-phase electric current is outputted to the load 14 by the adjustment of the timing of switching on/off of the switching power elements using the control circuit 26.

As described above, it is, possible to apply a voltage to the electrolytic capacitor Cs in the DC section 18 located on the subsequent stage of the diode group 16 from the former stage, not from the relay S in the present invention. Even when the relay S is Off, it is possible to cause the control circuit 26 to drive using the electrolytic capacitor Cs as a power supply. As a result, there is no possibility that the relay S may remain Off like a conventional one. Further, it is possible to avoid overvoltage by the electrolytic capacitor Cs of the energy-absorbing circuit 28 as well as a conventional one.

While embodiments of the present invention have been described so far, it is to be understood that the present invention is not limited to the aforementioned embodiments. For instance, the embodiment is also applicable to a three-phase inverter without capacitor, although a single-phase inverter without capacitor shown in FIG. 1 is applicable.

It should be understood that the present invention capable of other embodiments and of being carried out in aspects in which various improvements, modifications, and changes are added based on knowledge of those skilled in the art within a range not departing from the spirit of the invention.

What is claimed is:

1. A power converter circuit comprising:
    a diode group including a plurality of diodes arranged to rectify an output voltage of an alternating-current power supply;
    a relay provided at a point located closer to the alternating-current power supply than the diode group;
    a DC section where an output voltage of the diode group is applied;
    an inverter arranged to output a three-phase alternating-electric current to a three-phase load;
    a smoothing capacitor disposed between the diode group and the inverter; and
    an inductor connected in series relative to the alternating current power supply and the smoothing capacitor, the inductor and the smoothing capacitor being configured to be generally smoothing circutis,
    the DC section including an energy-absorbing circuit having a first resistor and an electrolytic capacitor, the energy absorbing circuit and the smoothing capacitor being connected in parallel relative to each other,
    the DC section further having a pathway arranged to apply the output voltage of the alternating-current power supply from the alternating-current power supply to the electrolytic capacitor via a rectifying circuit, not via the relay, and the pathway having a second resistor disposed therein, and
    a second resistance of the second resistor being greater than a first resistance of the first resistor.

2. The power converter circuit according o claim 1, further comprising
    a control circuit arranged and configured to control the inverter using a charging voltage of the electrolytic capacitor as a power supply.

3. The power converter circuit according to claim 2, wherein
    the control circuit is further arranged and configured to switch on/off of the relay using the charging voltage of the electrolytic capacitor as a power supply.

4. The power converter circuit according to claim 2, wherein
    the energy-absorbing circuit includes a diode series connected to the electrolytic capacitor.

5. The power converter circuit according to claim 2, wherein
    the energy-absorbing circuit includes a diode series connected to the first resistor.

6. The power converter circuit according to claim 2, wherein
    the rectifying circuit is one of a full-wave rectifying circuit and a half-wave rectifying circuit.

7. The power converter circuit according to claim 1, further comprising
    a control circuit arranged and configured to switch on/off of the relay using the charging voltage of the electrolytic capacitor as a power supply.

8. The power converter circuit according to claim 7, wherein
    the energy-absorbing circuit includes a diode series connected to the electrolytic capacitor.

9. The power converter circuit according to claim 7, wherein
    the energy-absorbing circuit includes a diode series connected to the first resistor.

10. The power converter circuit according to claim 7, wherein
the rectifying circuit is one of a full-wave rectifying circuit and a half-wave rectifying circuit.

11. The power converter circuit according to claim 1, wherein
the energy-absorbing circuit includes a diode series connected to the first resistor.

12. The power converter circuit according to claim 11, wherein
the rectifying circuit is one of a full-wave rectifying circuit and a half-wave rectifying circuit.

13. The power converter circuit according to claim 1, wherein
the rectifying circuit is one of a full-wave rectifying circuit and a half-wave rectifying circuit.

* * * * *